United States Patent
Schneider et al.

(10) Patent No.: US 10,857,741 B2
(45) Date of Patent: Dec. 8, 2020

(54) REPAIR METHOD FOR A WORKPIECE OF A PLASTICS MATERIAL, REPAIR APPARATUS

(71) Applicant: Deutsches Zentrum fuer Luft-und Raumfahrt e.V., Cologne (DE)

(72) Inventors: Marvin Schneider, Herrenberg (DE); Markus Kaden, Stuttgart (DE)

(73) Assignee: Deutsches Zentrum fuer Luft—und Raumfahrt e.V., Cologne (DE)

( * ) Notice: Subject to any disclaimer, the term of this patent is extended or adjusted under 35 U.S.C. 154(b) by 0 days.

(21) Appl. No.: 16/274,368

(22) Filed: Feb. 13, 2019

(65) Prior Publication Data
US 2019/0240923 A1 Aug. 8, 2019

Related U.S. Application Data

(63) Continuation of application No. PCT/EP2017/069636, filed on Aug. 3, 2017.

(30) Foreign Application Priority Data

Aug. 17, 2016 (DE) .......................... 10 2016 115 284

(51) Int. Cl.
*B32B 41/00* (2006.01)
*B29C 65/00* (2006.01)
(Continued)

(52) U.S. Cl.
CPC .... *B29C 66/91445* (2013.01); *B29C 65/1403* (2013.01); *B29C 66/91221* (2013.01);
(Continued)

(58) Field of Classification Search
CPC .............. B29C 66/91445; B29C 73/02; B29C 66/91221; B29C 65/1403; B29C 73/34; B29C 73/10; B29C 2035/0811
(Continued)

(56) References Cited

U.S. PATENT DOCUMENTS 4,287,015 A 9/1981 Danner, Jr.
4,975,311 A 12/1990 Lindgren
(Continued)

FOREIGN PATENT DOCUMENTS

DE 4237857 5/1994
DE 19731258 2/1999
(Continued)

*Primary Examiner* — Michael N Orlando
*Assistant Examiner* — Joshel Rivera
(74) *Attorney, Agent, or Firm* — Lipsitz & McAllister, LLC (57) ABSTRACT

A repair method for a workpiece of a plastics material is provided, wherein an induction heating apparatus is positioned at a repair region of the workpiece. The induction heating apparatus comprises a magnetic field generating device and a heat source. The heat source is arranged between the magnetic field generating device and the repair region. A repair material is positioned on the repair region and heated by way of the heat source. The heat source is inductively heated by the magnetic field generating device. A temperature (T) is measured by which an application of heat to the repair material by the heat source is characterized. The temperature (T) is controlled by means of a control device. The control of the temperature (T) by the control device occurs according to a temperature profile specification, which has a heating region and a working region following the heating region.

20 Claims, 5 Drawing Sheets

(51) Int. Cl.
*B29C 73/10* (2006.01)
*B29C 73/34* (2006.01)
*B29C 73/02* (2006.01)
*B29C 65/14* (2006.01)
*B29C 35/08* (2006.01)

(52) U.S. Cl.
CPC .............. *B29C 73/02* (2013.01); *B29C 73/10* (2013.01); *B29C 73/34* (2013.01); *B29C 2035/0811* (2013.01)

(58) Field of Classification Search
USPC .................. 156/60, 64, 350, 351, 378, 379
See application file for complete search history.

(56) References Cited

U.S. PATENT DOCUMENTS

| | | |
|---|---|---|
| 5,316,462 A | 5/1994 | Seemann |
| 5,424,943 A | 6/1995 | Hirzle |
| 6,091,063 A | 7/2000 | Woods |
| 8,980,029 B1 | 3/2015 | Nigro et al. |
| 2001/0009313 A1 | 7/2001 | McClure et al. |
| 2005/0183818 A1 | 8/2005 | Zenker et al. |
| 2008/0175753 A1 | 7/2008 | Clothier |
| 2011/0139769 A1 | 6/2011 | Miller et al. |
| 2012/0018089 A1 | 1/2012 | Gueret et al. |
| 2012/0145703 A1 | 6/2012 | Matsen et al. |
| 2013/0099429 A1 | 4/2013 | Filsinger et al. |
| 2014/0054830 A1 | 2/2014 | Hindersmann et al. |
| 2015/0001768 A1 | 1/2015 | Kia et al. |
| 2016/0082710 A1 | 3/2016 | Coxon et al. |
| 2016/0105929 A1* | 4/2016 | Spalding, Jr. ............ H05B 3/06 156/285 |

FOREIGN PATENT DOCUMENTS

| | | |
|---|---|---|
| DE | 102006033318 | 1/2008 |
| DE | 202011004357 | 7/2011 |
| DE | 102010025068 | 12/2011 |
| DE | 102013201681 | 8/2013 |
| DE | 10201207820 | 2/2014 |
| DE | 102011076463 | 9/2014 |
| DE | 202015100080 | 3/2015 |
| DE | 102013111266 | 4/2015 |
| DE | 102013223284 | 6/2015 |
| DE | 102014111358 | 2/2016 |
| DE | 102016209487 | 11/2017 |
| EP | 1732357 | 12/2006 |
| EP | 2575410 | 4/2013 |
| EP | 2796265 | 10/2014 |
| GB | 2192294 | 1/1988 |
| WO | 9639291 | 12/1996 |
| WO | 2010089479 | 8/2010 |

* cited by examiner

REPAIR METHOD FOR A WORKPIECE OF A PLASTICS MATERIAL, REPAIR APPARATUS

This application is a continuation of international application number PCT/EP2017/069636 filed on Aug. 3, 2017 and claims the benefit of German application number 10 2016 115 284.6 filed on Aug. 17, 2016, which are incorporated herein by reference in their entirety and for all purposes.

BACKGROUND OF THE INVENTION

The invention relates to a repair method for a workpiece of a plastics material, wherein an induction heating apparatus is positioned at a repair region of the workpiece, the induction heating apparatus comprises a magnetic field generating device and a heat source, the heat source is arranged between the magnetic field generating device and the repair region, a repair material is positioned on the repair region, the repair material is heated by way of the heat source arranged at the repair region, and the heat source is inductively heated by the magnetic field generating device.

The invention further relates to a repair apparatus on a workpiece of a plastics material, comprising an induction heating apparatus which is arranged at the workpiece, and a repair material which is arranged on a repair region of the workpiece, wherein the induction heating apparatus comprises a magnetic field generating device and a heat source, the heat source is arranged between the magnetic field generating device and the repair region, and the repair apparatus has at least one temperature sensor.

An induction heating apparatus is known from DE 20 2015 100 080 U1, comprising a support and a coil device which is arranged on the support. The coil device comprises a multitude of helical windings which are arranged in rows and columns, wherein the helical windings are configured such that when current is flowing through the helical windings, a current direction in adjacent rim winding sections of adjacent helical windings in a row or column is at least approximately the same.

A coil apparatus is known from DE 10 2013 111 266 A1, comprising at least one current-carrying high-frequency litz wire and a support for the at least one high-frequency litz wire. The at least one support is a mesh network and the at least one high-frequency litz wire is held by way of one or more tethers which abut against the at least one high-frequency litz wire and webs of the mesh network.

A repair apparatus for composite materials is known from U.S. Pat. No. 8,980,029 B1. The repair apparatus comprises a magnetic field generating device and a susceptor. The magnetic field generating device generates a magnetic flux which inductively heats the susceptor. The magnetic field generating device may be pressed by a compacting pressure against a repair unit with a repair site.

A method for determining in a clock-timed manner manipulated variables acting on a controlled system is known from DE 42 37 857 C2. In the method, a fictitious input variable for the following clock is determined from a primary input variable of the last preceding clock or primary input variables of preceding clocks and from a primary input variable of the current clock, wherein at least the fictitious input variable is taken into account for determining the manipulated variable according to the fuzzy logic.

A method for measuring the temperature of an inductively heated element is known from DE 197 31 258 A1. The heated element has a secondary heating winding, by means of which induction currents heating the element are generated to a primary winding through which current flows. For controlling or regulating the temperature of the element, the primary winding is intermittently connected to a current source, the temperature of the heating element is detected by means of a temperature sensor, and the measurement of the temperature is performed in current supply pauses of the primary coil.

A heating apparatus for an induction cooking appliance is known from EP 1 732 357 A2. The heating apparatus comprises an inductor for heating a heating element of a cooking container and a control unit which is prepared for monitoring the heating element for reaching a cooking temperature. The monitoring occurs by adjusting a frequency of the alternating current which flows through the inductor and by detecting at least one electrical variable as a function of time.

An induction cooking appliance with an IR-sensor is known from DE 10 2013 201 681 A1.

A method for inductively heating an end region of an elongate workpiece is known from GB 2 192 294 A.

An induction heating apparatus is known from US 2011/0139769 A1, comprising a heating mat, a magnetic field generating device, and a heat source. The magnetic field generating device and heat source are integrated into the structural material of the heating mat.

A repair apparatus for a workpiece of a fiber composite material is known from EP 2 796 265 A1, comprising an induction heating apparatus and a repair material which is arranged on the workpiece and which is heated by means of the induction heating apparatus.

SUMMARY OF THE INVENTION

In accordance with an embodiment of the invention a repair method is provided which is easy to carry out and may be flexibly used.

In accordance with an embodiment of the invention provision is made that a temperature is measured by which an application of heat to the repair material by the heat source is characterized, in that the temperature is controlled by means of a control device, in that the control of the temperature by the control device occurs according to a temperature profile specification, and in that the temperature profile specification has a heating region and a working region following the heating region.

The workpiece is a fiber composite material component, for example. It has damage at the repair region.

For carrying out the repair method, the heat source is arranged at the repair region and is inductively heated by the magnetic field generating device. The heat source, in turn, heats the repair material arranged on the repair region of the workpiece.

The heat source is arranged between the magnetic field generating device and the repair region. Magnetic field generating device and heat source are separate components of the induction heating apparatus which may be positioned separately from each other. The heat source is thereby individually adaptable to a surface of the repair region. The heat source may be positioned directly on the surface of the repair region, whereby an improved introduction of heat into the repair region of the workpiece is achieved.

Magnetic field generating device and heat source are materially separate from each other. The heat source may thereby, e.g., be shielded by a thermal insulating layer. As a result, the repair method with the induction heating apparatus may be used particularly flexibly and carried out efficiently.

The control device controls the temperature by which the application of heat to the repair material by the heat source is characterized. In this way, the temperature at the repair material may be controlled.

The repair material is, e.g., a thermoplastic or a thermosetting repair material. Depending on the repair material used, a different temperature profile over time is necessary at the repair material for carrying out the repair method.

Through the control of the temperature by the control device according to the temperature profile specification, the repair method may be carried out in a simple manner with different repair materials. This enables a flexible use of the repair method.

The temperature profile specification has a heating region and a working region following the heating region. For carrying out the repair method with the thermosetting repair material, a defined temperature profile over time within the heating region is required, for example. A desired chemical change to the repair material takes place within the working range.

In particular, the magnetic field generating device is applied with an electric current, wherein the electric current and/or an electric voltage and/or electric power resulting from the application of current is a controlled variable. The temperature at the repair material may thereby be controlled and/or regulated in a simple manner.

It is then favorable if the electric current and/or the electric voltage and/or the electric power is controlled by the control and/or regulating device in such a way that a time profile of an effective value of the electric current and/or an effective value of the electric voltage and/or an effective value of the electric power at least approximately corresponds to a time profile of the temperature. This enables a simple control of the application of current by the control device if the current with which the magnetic field generating device is applied is an alternating current, for example. A more precise regulation of the temperature by the control device is thereby made possible.

It is advantageous if the application of current to the magnetic field generating device is deactivated for control pause times and if the regulation of the temperature occurs according to the temperature profile specification by way of the deactivation of the application of current with the control pause times. The control of the temperature by the control device may thereby be achieved in a simple manner.

In particular, in the operation of the induction heating apparatus, the temperature is measured by at least one temperature sensor and the temperature measured is transmitted to the control device. As a result, a simple measurement of the temperature near the repair material may be carried out. The temperature may then be regulated by the control device in a simple manner.

In particular, the temperature profile specification is at least approximately constant within the working region. The desired chemical change to the repair material occurs within the working region. As a result, e.g., the desired chemical change to the thermoplastic or thermosetting repair material may be carried out in a simple manner.

In particular in the case of a thermoplastic repair material, the temperature profile within the heating region specification is monotonically increasing and has in particular a constant slope. The repair method may then be carried out in a simple manner in the case of the thermoplastic repair material. As a result of the monotonically increasing temperature profile specification, the working region may be quickly and easily reached.

In particular in the case of a thermosetting repair material, the temperature profile specification within the heating region is monotonically increasing in sections and has in particular a constant slope in sections. The repair method may thus be carried out in a simple manner in the case of a thermosetting repair material. The working region may then be easily and quickly reached.

It is favorable if in the case of a thermosetting repair material, the temperature profile specification has within the heating region a plateau region in which the temperature profile specification is at least approximately constant, and in particular if within the plateau region volatile components of the thermosetting repair material are vaporized. The plateau region is necessary in the case of the thermosetting repair material in order to vaporize volatile components like, e.g., solvents. The desired chemical change to the thermosetting repair material may thereby occur within the working region. The repair method may in this way be carried out with the thermosetting repair material.

In particular, in the case of a thermosetting repair material, the temperature profile specification has within the heating region an increase starting from an initial temperature, wherein the increase is followed by a plateau region in which the temperature profile specification is at least approximately constant, and wherein the plateau region is followed by a further increase. As a result, the repair method may be easily carried out with the thermosetting repair material.

In one embodiment, the temperature profile specification has a cooling region following the working region. Within the cooling region, the temperature profile specification is in particular monotonically falling and has in particular a constant slope. This enables a simple and defined cooling of the repair material. In the event that the application of heat to the repair material by the heat source is still weakly active, a cooling rate of the repair material may be reduced, for example.

It is favorable if an underpressure region is produced between a vacuum hood of the induction heating apparatus and the workpiece, in particular a pressure within the underpressure region is measured, and in particular the pressure is controlled and/or regulated by means of the control device. As a result of the underpressure region, the vacuum hood is pressed against the workpiece. The vacuum hood may hereby be easily positioned on the workpiece. By measuring the pressure within the underpressure region, the pressure within the underpressure region may be controlled in a simple manner with the control device.

In particular, a pump power of the underpressure application device is a controlled variable, wherein the pump power is controlled by the control device. As a result, the pressure within the underpressure region may be controlled in a simple manner by the control device.

In particular, in the operation of the induction heating apparatus, the pressure is measured by at least one pressure sensor and the pressure measured is transmitted to the control device. The pressure within the underpressure region may be measured in a simple manner by the at least one pressure sensor. As a result, the pressure may be regulated in a simple manner by the control device.

In particular, the control of the pressure by the control device occurs according to a specified working pressure or a specified working pressure range. As result, the pressure within an underpressure region may be specified according to a repair method to be carried out. This enables a flexible use of the repair method.

In particular, a constant spacing is produced between the magnetic field generating device and the heat source. As a result of the constant spacing, the heat source may be homogeneously heated by means of a homogeneous magnetic field generated by the magnetic field generating device. A homogeneous heating of the repair material is hereby also made possible.

In particular, an application of current to the magnetic field generating device is deactivated for a pause time, wherein within this pause time the temperature is measured and/or a pressure is measured. The temperature measured and/or the pressure measured are transmitted to the control device within the pause time. In the operation of the induction heating apparatus, a temporally variable electromagnetic field is generated by the magnetic field generating device, which electromagnetic field is the cause of interference currents which are induced, e.g., in a temperature sensor and/or in a pressure sensor as well as in the lines thereof. Within the pause time, a low-interference measurement of the temperature and/or the pressure may be carried out. The temperature measured and/or the pressure measured may be transmitted to the control device in a low-interference manner within the pause time.

In particular, the application of voltage is deactivated in a clock-timed manner with a clock frequency and the temperature and/or the pressure are measured in a clock-timed manner with this clock frequency. A low-interference measurement of the temperature and/or the pressure at temporally regular intervals may hereby be carried out in a simple manner.

It is favorable if the temperature and/or the pressure are measured temporally offset by a first wait time after the beginning of the pause time. Within the wait time, interference currents can decay which are possibly still present at the beginning of the pause time. As a result, the accuracy of the measurement of the temperature and/or the pressure may be further improved.

In particular, a measurement of the temperature and/or the pressure is completed temporally offset by a second wait time before the end of the pause time. The temperature measured and/or the pressure measured may thereby be transmitted to the control device in a low-interference manner.

In particular, the repair material is arranged in solid form on the repair region. The repair material may thereby be easily processed and adapted to the geometry of the repair region. The repair material may then be arranged in layers on the repair region.

In one variation of the method, a thermal insulating layer is arranged between the magnetic field generating device and the heat source. The thermal shielding of the heat source is thereby improved. As a result, in the operation of the induction heating apparatus, a heat radiation, for example, via a side of the heat source remote from the workpiece may be reduced. The efficiency and the effectiveness of the repair method with the induction heating apparatus is thereby increased.

In accordance with the invention, provision is made in the repair apparatus stated at that outset for the at least one temperature sensor to measure a temperature by which an application of heat to the repair material by the heat source is characterized, for the at least one temperature sensor to be signal-operatively connected to a control device, for the control device to have a storage device in which a temperature profile specification is stored, and for the control device to control the temperature, measured by the at least one temperature sensor, according to the stored temperature profile specification. The repair apparatus in accordance with the invention already has the advantages discussed in conjunction with the method in accordance with the invention.

Further advantageous embodiments of the repair apparatus in accordance with the invention were already discussed in conjunction with the repair method in accordance with the invention.

In particular, the induction heating apparatus is configured to be flexurally flexible with the vacuum hood, the magnetic field generating device, and the heat source. The repair apparatus may then be used on workpieces with a curved surface.

In one embodiment, a thermal insulating layer is arranged between the magnetic field generating device and the heat source. The effectiveness of the induction heating apparatus is thereby increased.

In particular, the repair method in accordance with the invention is able to be carried out with the repair apparatus in accordance with the invention or is carried out with the same.

In particular, the repair method in accordance with the invention is able to be carried out with the repair apparatus in accordance with the invention or is carried out with the same.

BRIEF DESCRIPTION OF THE DRAWINGS

The subsequent description of preferred embodiments serves in conjunction with the drawings for further explanation of the invention.

In the drawings.

DETAILED DESCRIPTION OF THE INVENTION

Figure 1:
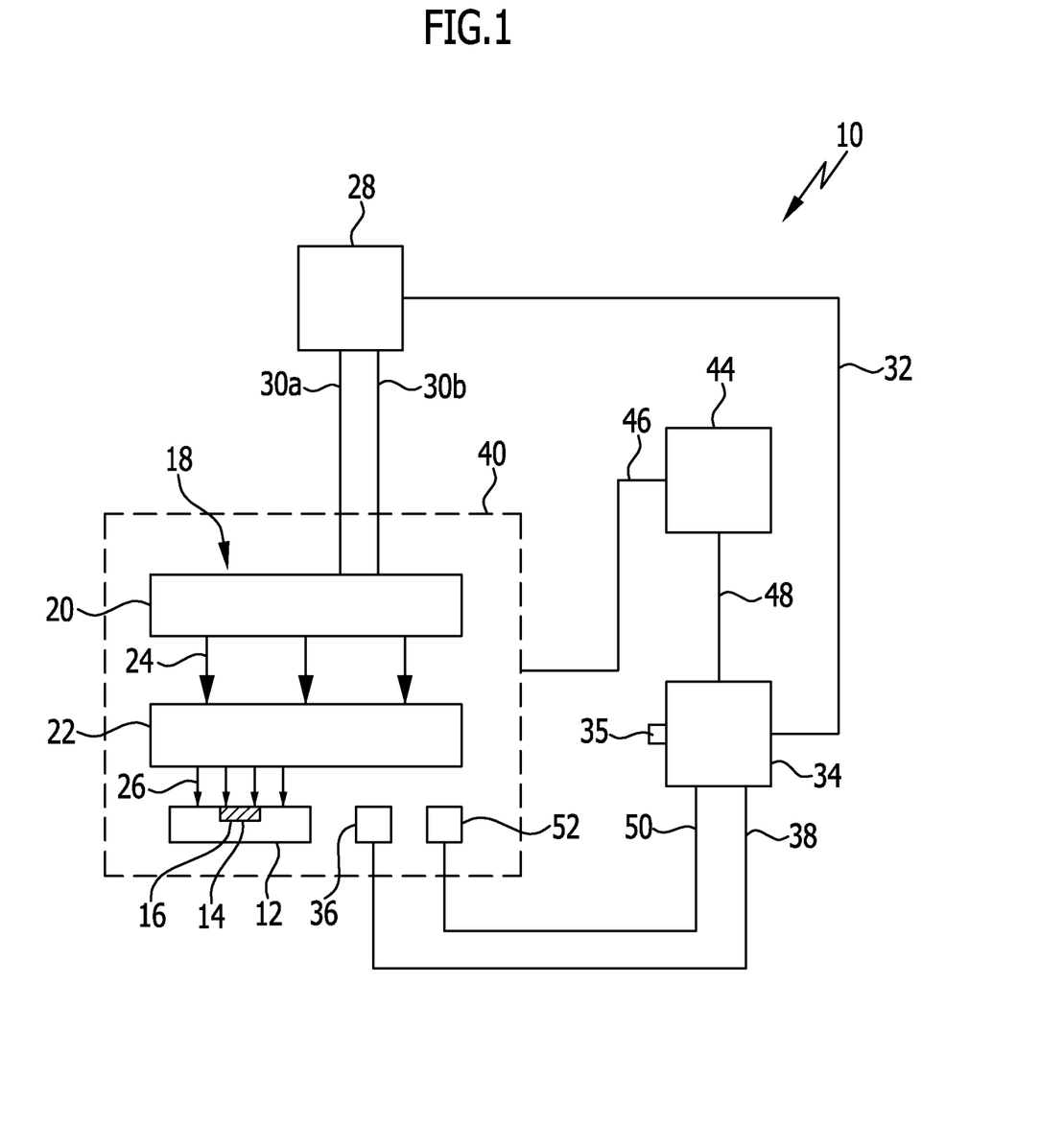
FIG. 1 shows a schematic depiction of an embodiment of a repair apparatus.

An embodiment of a repair apparatus, which is schematically shown in FIG. 1 and is denoted there by 10, comprises a workpiece 12 as a repair object.

The workpiece 12 is produced of a plastics material. It is a fiber composite material component, for example. The workpiece 12 has a repair region 14 with damage. A repair material 16 is arranged on the repair region 14.

The repair material 16 has a solid form. Alternatively hereto, it may also be viscous with a large time constant.

The repair material 16 comprises in particular a repair resin.

Figure 2:
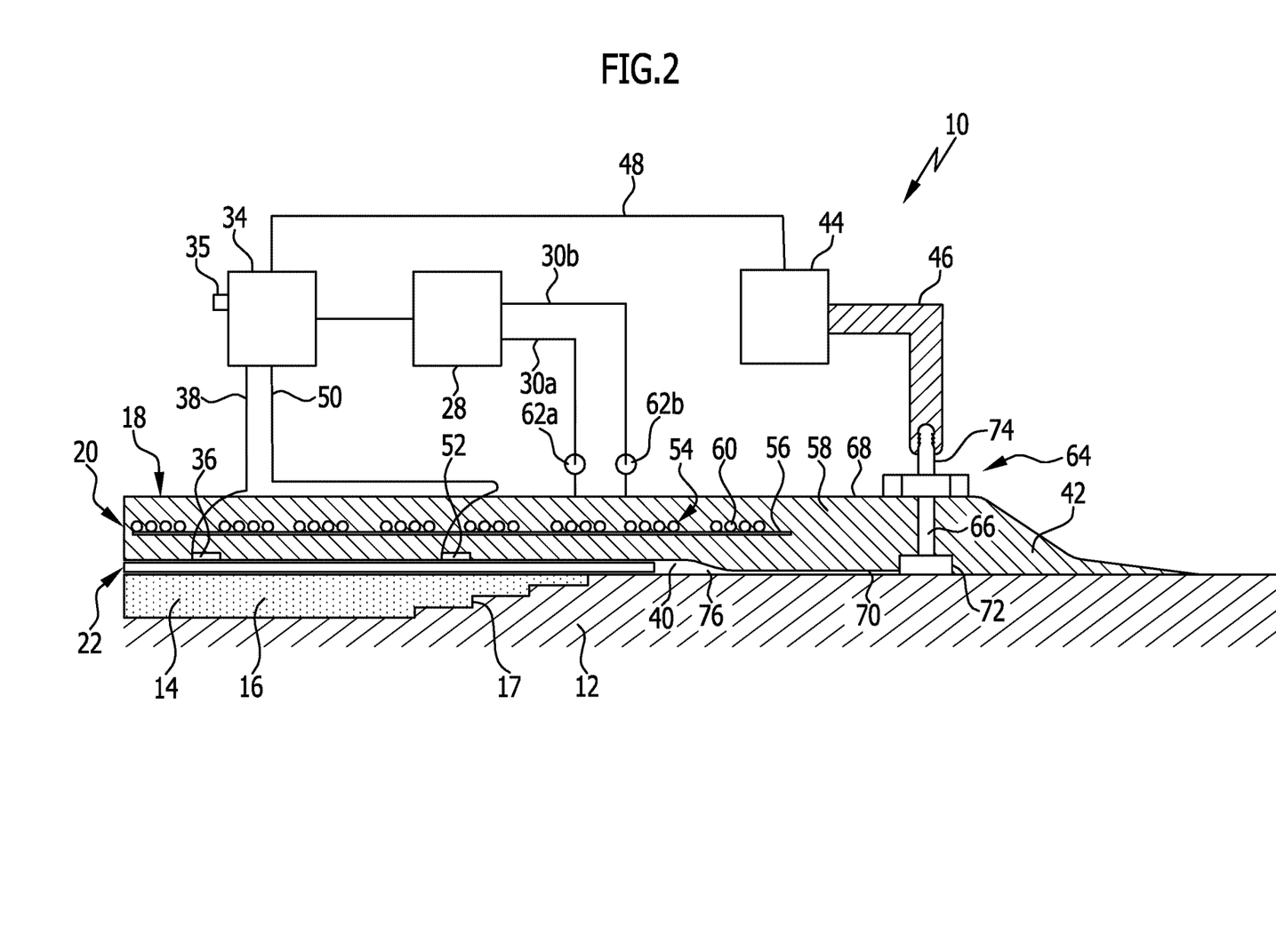
FIG. 2 shows a sectional view of a workpiece on which on which an embodiment of a repair apparatus is arranged.

The repair material 16 is arranged on the repair region 14 in individual layers 17 (FIG. 2).

The repair apparatus 10 comprises an induction heating apparatus 18. The induction heating apparatus 18 has a magnetic field generating device 20 and a heat source 22. The heat source 22 is arranged between the magnetic field generating device 20 and the workpiece 12.

The magnetic field generating device 20 serves for generating a homogeneous electromagnetic field 24 (indicated by arrows), which is inductively converted into heat 26 by the heat source 22 (indicated by arrows). The repair material 16 is applied with the heat 26.

The magnetic field generating device 20 and heat source 22 are mutually separate components of the induction heating apparatus 18. Magnetic field generating device 20 and heat source 22 may thereby be positioned separately of each other.

The magnetic field generating device 20 is connected to an induction generator 28 in an electrically-operative manner by way of lines 30a, 30b. The induction generator 28 generates a high-frequency alternating electric current with which the magnetic field generating device 20 is applied. The frequency is at least 20 kHz and is typically at about 150 kHz.

The induction generator 28 is signal-operatively connected to a control device 34 (control and/or regulating device 34) by way of a line 32. The control device 34 controls the alternating current with which the magnetic field generating device 20 is applied by the induction generator 28. It controls an effective value i of the alternating current, for example.

The control device 34 comprises a storage device 35 in which a temperature profile specification 35' (FIG. 3) for a temperature T is stored.

The effective value i of the alternating current with which the magnetic field generating device 20 is applied is a controlled variable for a regulation of the temperature T by the control device 34. An application of heat to the repair material 16 by the heat source 22 is characterized by the temperature T.

At least one temperature sensor 36 which measures the temperature T is arranged in a region of the heat source 22. The temperature sensor 36 is signal-operatively connected to the control device 34 by way of a line 38. The temperature T measured by the temperature sensor 36 is transmitted to the control device 34 in this way.

The temperature T measured by the temperature sensor 36 is an actual temperature. The temperature T is a regulating variable which is regulated by the control device 34. For this purpose, the latter controls the effective value i which is a controlled variable. In this way, a regulation of the temperature T may be carried out according to the temperature profile specification 35' (desired temperature).

Alternatively hereto, provision may be made for an effective value of an alternating electric voltage or an effective value of an electric power, which value results from the application of alternating current to the magnetic field generating device 20, is a controlled variable for the regulation of the temperature T. The control device 34 then controls the effective value of the electric alternative voltage or the effective value of the electric power.

Provision may be made for an underpressure region 40 to be produced between a vacuum hood 42 (FIG. 2) of the induction heating apparatus 18 and the workpiece 12. An application of underpressure to the underpressure region 40 by an underpressure application device 44 occurs for this purpose. The underpressure application device 44 is a vacuum pump, for example. It is fluidically connected to the underpressure region 40 by a line 46.

The underpressure application device 44, in turn, is signal-operatively connected to the control device 34 by way of a line 48. The control device 34 controls, e.g., a pump power of the underpressure application device 44.

The pump power is a controlled variable for a regulation of a pressure P within the underpressure region 40 by the control device 34.

The control device 34 is signal-operatively connected to a pressure sensor 52 by way of a line 50. The pressure sensor 52 is arranged within the underpressure region 40 and measures the pressure P there. The pressure P measured by the pressure sensor 52 is transmitted to the control device 34 by way of the line 50.

The pressure P measured by the pressure sensor 52 is an actual pressure. The control device 34 regulates the pressure P within the underpressure region 40. The pressure P is a regulating variable.

For regulating the pressure P, the control device 34 controls the pump power of the underpressure application device 44, which is a controlled variable. In this way, a regulation of the pressure P may be carried out according to a specified desired pressure.

The control device 34 uses, e.g., a PID regulation or a fuzzy logic for matching a measured actual value of a variable to a specified desired value.

A constant spacing is produced between the magnetic field generating device 20 and the heat source 22 by the underpressure region 40. Further, a constant spacing is produced between the heat source 22 and the workpiece 12.

In the embodiment shown in FIG. 2, the vacuum hood 42 is positioned on the workpiece 12. The heat source 22 is arranged between the repair material 16 at the repair region 14 and the vacuum hood 42. Said heat source 22 is a loose constituent part of the induction heating apparatus 18.

The magnetic field generating device 20 of the induction heating apparatus 18 comprises a coil device 54 with a support 56. The coil device 54 is embedded in a structural material 58 of the vacuum hood 42.

The coil device 54 is configured to be flexurally flexible as a whole with the vacuum hood 42.

The support 56 is produced of an electrically insulating material. For example, it is a fiber structure and a textile structure, like a woven or knitted fabric.

A current-carrying high-frequency litz wire 60 is arranged on the support 56.

The high-frequency litz wire 60 serves for carrying a high-frequency alternating current. It is a wire bundle of individual wires which each are electrically insulated from each other by an insulation.

In the operation of the induction heating apparatus 18, the individual wires of the wire bundle of the high frequency litz wire 60 are connected to the induction generator 28 in an electrically-operative manner by way of the lines 30a, 30b. For this purpose, the high frequency litz wire 60 has corresponding connectors 62a, 62b which are arranged in an outer region of the vacuum hood 42.

The coil device 54 is configured such that a homogeneous field distribution of the electromagnetic field 24 is achieved by way of a face of the coil device 54.

Reference is made to DE 10 2013 111 266 A1 and to DE 20 2015 100 080 U1 of the same applicant regarding further details on the configuration of the coil device 54 and the high-frequency litz wire 60. Express reference is made thereto in its entirety.

In particular, the structural material 58 of the vacuum hood 42 is flexurally flexible. In particular, it is gas-tight and/or electrically insulating. The structural material 58 is a silicone material, for example.

The vacuum hood 42 comprises a channel device 64 with a supply channel 66 which runs from an upper side 68 to an underside 70 of the vacuum hood 42.

The supply channel 66 opens at the underside 70 into a manifold 72. Channels are fluidically connected to the manifold 72, wherein the channels in particular run on the underside 70 and/or are open toward the underside 70.

A connector 74 is arranged at an opening of the supply channel 66 into the upper side 68. The connector 74 is fluidically connected to the underpressure application device 44 by way of the line 46. The underpressure region 40 may in this way be produced between a side 76 of the workpiece 12 and the underside 70 of the vacuum hood 42.

The heat source 22 is positioned spaced apart from the coil device 54 and is electrically separated from it by way of the structural material 58.

The heat source 22 is electrically conductive and in particular configured to be flexurally flexible. For example, it is a thin metal sheet or metal mesh.

The heat source 22 is homogeneously heated by means of the homogeneous electromagnetic field 24 generated by the magnetic field generating device 20.

The temperature sensor 36 is positioned on the underside 70 of the vacuum hood 42. The vacuum sensor 36 may be at least partially embedded into the structural material 58 of the vacuum hood 42. The line 38 which is in a signal-operative contact with the temperature sensor 36 is in particular guided outward by way of the structural material 58 of the vacuum hood 42.

The pressure sensor 52 is arranged within the underpressure region 40. It is arranged analogously to the temperature sensor 36 on the underside 70 of the vacuum hood 42. The line 50 which is signal-operatively connected to the pressure sensor 52 is in particular guided outward by way of the structural material 58 of the vacuum hood 42.

Regarding further details of the induction heating apparatus 18 and the vacuum hood 42, reference is made to the not previously published German patent application No. 10 2016 209 487.4 of 31 May 2016 from the same applicant. Express reference is made thereto in its entirety.

Figure 8:
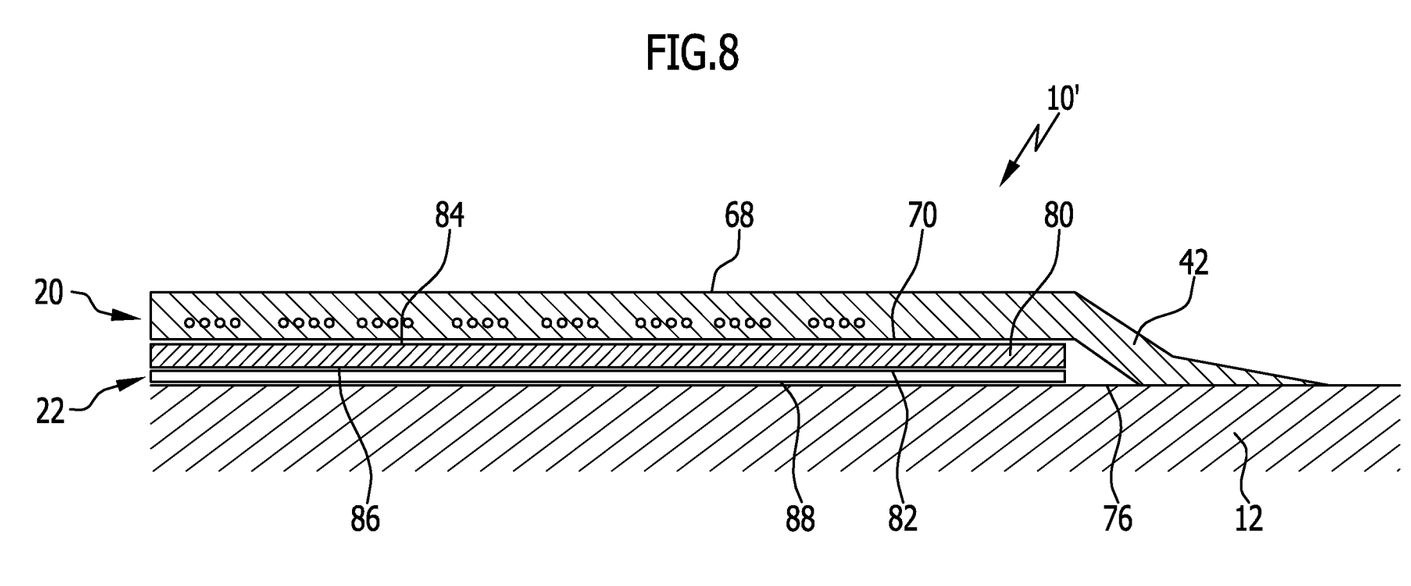
FIG. 8 shows a schematic depiction of a portion of a further embodiment of a repair apparatus.

A further embodiment of a repair apparatus 10', of which a portion is shown in FIG. 8, comprises at least one thermal insulating layer 80. The repair apparatus 10' is basically of identical construction and has basically the same functionality as the repair apparatus 10 described above. Components of the repair apparatus 10' which are identical to the components of the repair apparatus 10 are subsequently designated with the same reference numerals. The preceding description continues to apply to these components.

The thermal insulating layer 80 is positioned between the magnetic field generating device 20 and the heat source 22. The thermal insulating layer 80 is arrange, e.g., between the underside 70 of the vacuum hood 42 and a side 82 of the heat source 22 facing the underside 70.

The thermal insulating layer 80 is in particular of flat configuration. The thermal insulating layer 80 has a first side 84 and a second side 86 located opposite the first side 84. In the embodiment according to FIG. 8, the first side 84 is facing the underside 70 of the vacuum hood 42. In the embodiment shown, the second side 86 is facing the side 82 of the heat source 22.

The first side 84 and/or the second side 86 are in particular of planar configuration.

In particular, the first side 84 of the thermal insulating layer 80 contacts the underside 70 of the vacuum hood 42. The second side 86 contacts in particular the side 82 of the heat source 22.

The heat source 22 is arranged between the second side 86 and the side 76 of the workpiece 12 which faces the underside 70 of the vacuum hood 42.

A side 88 of the heat source 22 opposite the side 82 faces the side 76 of the workpiece 12. The side 88 of the heat source 22 contacts in particular the side 76 of the workpiece 12. The side 82 of the heat source 22 contacts in particular the second side 86 of thermal insulating layer 80.

The thermal insulating layer 80 is produced of an electrical insulator material. The material of which the thermal insulating layer 80 is produced has a low thermal conductivity. The material has, for example, a lower thermal conductivity than the structural material 58 of the vacuum hood 42. The thermal insulating layer 80 is produced, e.g., of a heat-insulating plastic.

In the operation of the repair apparatus 10', a heat radiation of the heat source 22 in the direction of the upper side 68 of the vacuum hood 42 may be reduced by the thermal insulating layer 80. As a result, the efficiency of the induction heating apparatus 18 and the repair apparatus 10' is increased.

A repair method with the repair apparatus 10 functions as follows:

First, the workpiece 12 is provided with the repair material 16 on the repair region 14. For this purpose, the repair material, e.g., is cut to size in solid form and arranged in layers 17 on the repair region 14. The repair material 16 can then later materially bond to a structural material of the workpiece 12 by heating. The damage at the repair region 14 of the workpiece 12 can thereby be restored.

In a next step, the heat source 22 is arranged on the side 76 of the workpiece 12 above the repair region 14. The vacuum hood 42 is placed with its underside 70 over the heat source 22, such that the coil device 54 is located above the heat source 22. The boundaries of the underside 70 of the vacuum hood 42 project beyond the boundaries of the heat source 22.

The heat source 22 is arranged, e.g., separate from the vacuum hood 42 on the workpiece 12. The vacuum hood 42 is then positioned at the heat source 22. In this way, the heat source 22 may in particular be arranged between the underside 70 of the vacuum hood 42 and the side 76 of the workpiece 12.

In the case of the repair apparatus 10', which has the additional thermal insulating layer 80, in particular, first the heat source 22 is arranged on the side 76 of the workpiece 12. The thermal insulating layer 80 is then arranged, e.g., with its second side 86 on the side 88 of the heat source 22 remote from the workpiece 12. The vacuum hood 42 is then arranged on the thermal insulating layer 80 so that, e.g., the underside 70 of the vacuum hood 42 faces the first side 84 of the thermal insulating layer 80. The thermal insulating layer 80 is in this way positioned, e.g., between the underside 70 of the vacuum hood 42 and the side 82 of the heat source 22.

The underpressure region 40 is produced between the vacuum hood 42 and the workpiece 12 by means of the underpressure application device 44. Due to the underpressure region 40, the underside 70 of the vacuum hood 42 is pressed against the side 76 of the workpiece 12. The underside 70 is also pressed against the heat source 22, which, in turn, is pressed against the side 76 of the workpiece 12. In this way, a constant spacing is produced between the magnetic field generating device 20 and the heat source 22. Further, a constant spacing arises between the heat source 22 and the layers 17 of the repair material 16.

An alternating electric current is generated by the induction generator 28, with which current the coil device 54 of the magnetic field generating device 20 is applied. A homogeneous electromagnetic alternating field 24 arises as a result of the alternating current at the coil device 54. Due to this homogeneous electromagnetic alternating field 24, currents are induced in the heat source 22, the latter thereby being homogeneously heated. The heat source 22, in turn, heats the repair material 16 which is arranged below the heat source 22.

The heat source 22 is homogeneously heated as a result of the constant spacing between the magnetic field generating device 20 and the heat source 22. The layers 17 of the repair material 16, in turn, are hereby homogeneously heated.

The flexurally flexible configuration of the induction heating apparatus 18 with the heat source 22 enables a homogeneous heating of the layers 17 of the repair material 16, even in the case that the repair region 14 and/or the side 76 has a curved surface.

The pressure sensor 52 measures the pressure P (actual pressure) within the underpressure region 40. The pressure P measured is transmitted to the control device 34. The control device 34 regulates the pressure P within the underpressure region 40.

The desired pressure may be specified at the control device 34, according to which desired pressure the pressure P is regulated within the underpressure region 40 by the control device 34. For this purpose, the control device 34 controls, e.g., the pump power of the underpressure application device 44.

The specified desired pressure corresponds, e.g., to a working pressure required for the repair method.

The temperature sensor 36 measures the temperature T (actual temperature). The temperature T measured is transmitted to the control device 34. The control device 34 regulates the temperature T by which the application of heat to the repair material 16 by the heat source 22 is characterized.

The desired temperature may be specified at the control device 34, to which desired temperature the temperature T is matched by the control device 34.

For this purpose, the control device 34 controls the effective value i of the alternating current with which the coil device 54 of the magnetic field generating device 20 is applied.

Provision is made for the temperature profile specification 35' for the desired temperature to be stored at the control device 34, according to which the temperature T is regulated by the control device 34.

A change in the effective value i of the alternating current by the control device 34 causes a change in the inductive heating of the heat source 22. For example, an increase in the effective value i leads to a stronger inductive heating and a reduction in the effective value i leads to a weaker inductive heating of the heat source 22.

A change to the effective value i by the control device 34 leads at least approximately to an instantaneous change in a temperature of the heat source 22.

The effective value i is controlled by the control device 34 in such a way that a time profile of the effective value i at least approximately corresponds to the time profile of the temperature T measured. For this purpose, there occurs a sufficiently slow adjustment of the effective value i to the temperature profile specification 35'.

Alternatively or in addition, provision may be made for the application of current to the magnetic field generating device 20 to be deactivated by the control and/or regulating device 34 for control pause times. The regulation of the temperature T according to the temperature profile specification 35' then occurs via the deactivation of the application of current with the control pause times. The deactivation of the application of current occurs in particular with sufficiently short control pause times and in particular with a sufficiently high clock frequency, such that an exact regulation of the temperature T according to the temperature profile specification 35' by the control and/or regulating device 34 is made possible.

In this way, a temperature profile over time for the temperature T according to the temperature profile specification 35' may be specified for the repair method depending on the repair material 16 used.

The temperature profile specification 35' has a heating region 77a and a working region 77b following the heating region 77a. A cooling region 77c follows the working region 77b. The desired chemical change to the repair material 16 used takes place within the working region 77b.

The repair material 16 is a thermoplastic repair material 16, for example, which is deformable at a certain working temperature. In this case, a temperature profile specification 35' is specified which has at least approximately a linear increase within the heating region 77a commencing from an initial temperature (for example room temperature), until the working temperature is reached. Within the working region 77b, the specified temperature profile over time is constant over time and corresponds to the working temperature. The working region 77b has a length in time of a few minutes to a few hours, depending on the specification of the thermoplastic repair material 16. A cooling of the repair material 16 to the initial temperature then takes place within the cooling region 77c.

Alternatively hereto, a thermosetting repair material 16 may be used as a repair material 16. In a thermosetting repair material 16, a chemical conversion of substances occurs in dependence on a specific temperature profile over time. For carrying out the repair method with the thermosetting repair material, it is necessary for the temperature profile specification 35' to have a specific increase within the heating region 77a.

Figure 3:
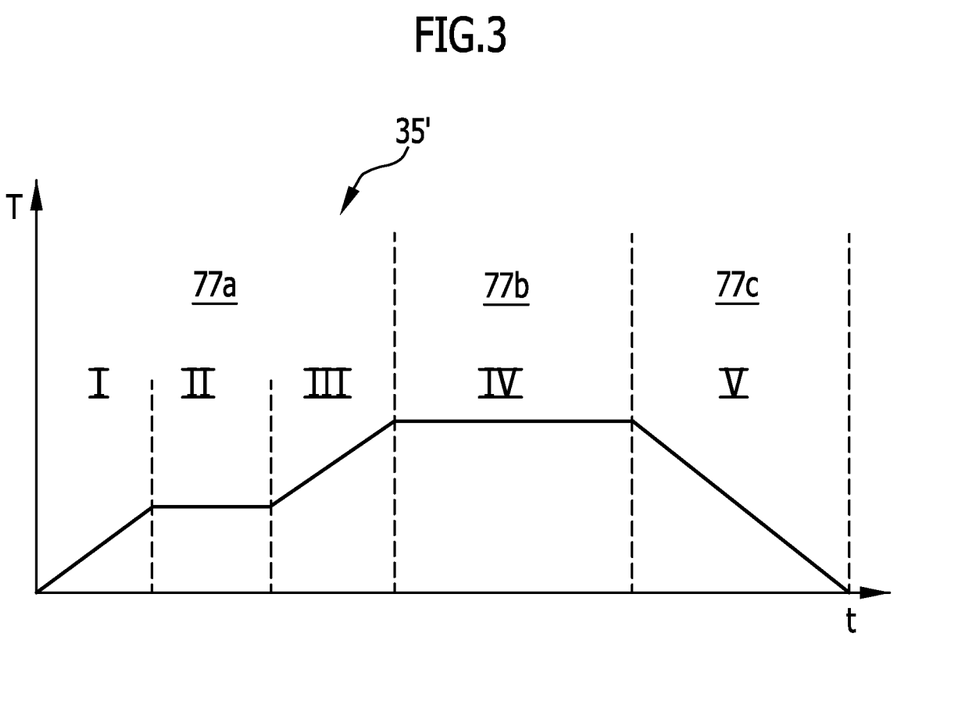
FIG. 3 shows a specified time profile of a temperature by which an application of heat to a repair material is characterized.

An example of such a temperature profile specification 35' for the temperature T is schematically depicted in FIG. 3 as a function of time.

The temperature profile specification 35' has a first region I in which the temperature T is monotonically increasing. The temperature T has a constant slope in the first region I.

In a second region II following the first region I, the temperature profile specification 35' has a plateau region in which the temperature T is constant over time. For a duration in time of the plateau region, volatile components of the thermosetting repair material 16 are vaporized. This is necessary in order to later carry out the chemical change in the thermosetting repair material.

The second region II is followed by a third region III in which the temperature T increases monotonically as a function of time analogously to region I, until the temperature of the working region 77b is reached.

The regions I to III correspond to the heating region 77a of the temperature profile specification 35'. A fourth region IV following the third region III corresponds to the working region 77b.

Within the fourth region IV, the temperature profile specification 35' for the temperature T is constant over time. Depending on the specification of the thermosetting repair material 16, a duration in time of the region IV is a few minutes or up to a few hours.

The fourth region IV is followed by a fifth region V which corresponds to the cooling region 77c of the temperature profile specification 35'. Within the fifth region V, the repair material 16 is cooled to the initial temperature. In the fifth region V, the temperature V falls monotonically. The temperature T has in particular a constant slope in the fifth region V.

The temperature profile specification 35' is selected within the fifth region V such that, for example, the application of heat to the repair material 16 by the heat source 22 is still weakly active. It is thereby possible to define a cooling rate of the repair material 16. As a result, the cooling rate of the repair material 16 may, for example, be reduced in relation to a cooling rate without additional application of heat.

Following the application of heat to the repair material 16 according to the temperature profile specification 35', the repair method is completed. For this purpose, in a last step, the components of the induction heating apparatus 18 are deactivated and the vacuum hood 42 as well as the heat source 22 are removed from the workpiece 12.

In the operation of the induction heating apparatus 18, a temporally variable electromagnetic field 24 is generated by the magnetic field generating device 20. Said electromagnetic field 24 is the cause of interference currents which are induced in the temperature sensor 36, the pressure sensor 52, as well as in the lines 38 and 50. A measurement of the temperature T by the temperature sensor 36 and of the pressure P by the pressure sensor 52 is distorted by the interference currents.

In order to enable a low-interference collection of measurement values by sensors within the electromagnetic field 24, provision may be made that, for carrying out a measurement, the application of the magnetic field generating device 20 with the alternating current is deactivated for a pause time Z1. This deactivation of the application of current leads to a dissipation of the electromagnetic field 24 and likewise to a dissipation of the interference currents within the pause time Z1.

The measurement of the temperature T by the temperature sensor 36 and of the pressure P by the pressure sensor 52 occurs during the pause time Z1 when the application of current to the magnetic field generating device 20 is deactivated. In this way, a low-interference measurement of the temperature T and the pressure P may be carried out.

Figure 4:
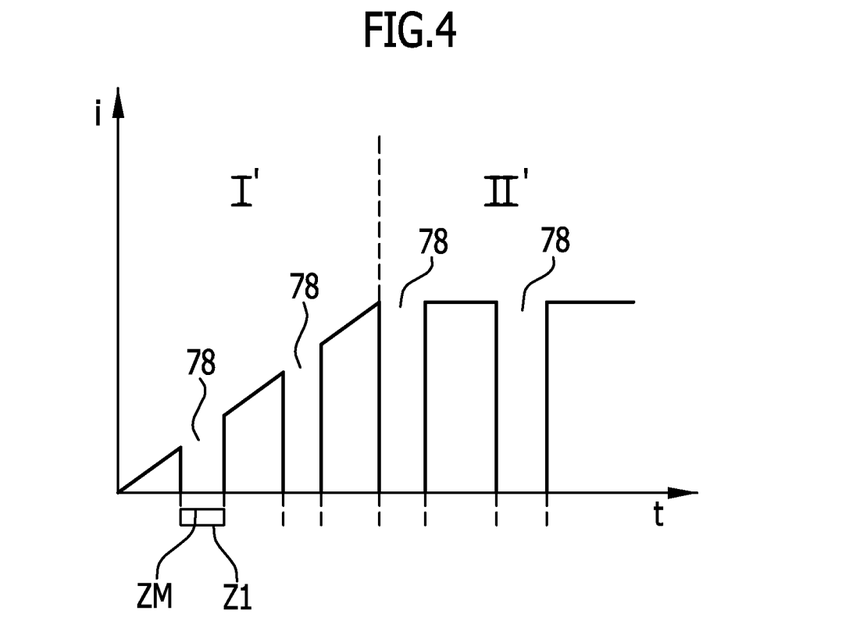
FIG. 4 shows a time profile of an effective value of a current with which a magnetic field generating device is applied.

An exemplary time profile of the effective value i of the alternating current at the magnetic field generating device 20 is schematically depicted in FIG. 4 as a function of time. The time profile has a first region I' in which the effective value i increases. The first region I' is followed by a second region II' in which the effective value i is constant. The first region I' corresponds, at least approximately, to a linear increase over time of the temperature T. The second region II' corresponds, at least approximately, to a constant profile over time of the temperature T.

The time profile of the effective value i has interruptions 78. A duration in time of said interruptions 78 corresponds in each case to the pause time Z1. Within the pause time Z1, the effective value i is zero. During the pause time Z1, the measurement is carried out, the carrying out of the measurement happening within the measuring time Zm. The measuring time Zm corresponds at least approximately to the pause time Z1.

A beginning of the pause time Z1 corresponds at least approximately to a beginning of the measuring time Zm. An end of the pause time Z1 corresponds at least approximately to an end of the measuring time Zm.

After the end of the pause time Z1, the application of current to the magnetic field generating device 20 is continued.

The pause time Z1 is in particular so short that the temperature T measured at least approximately does not change during the deactivation of the application of current.

For example, the application of current to the magnetic field generating device 20 is deactivated in a clock-timed manner with a clock frequency. In this case, a time period between successive interruptions 78 is constant. A measurement, clock-timed with this clock frequency, of the temperature T and the pressure P is then carried out at the respective pause times Z1 of the interruptions 78.

Figure 5:
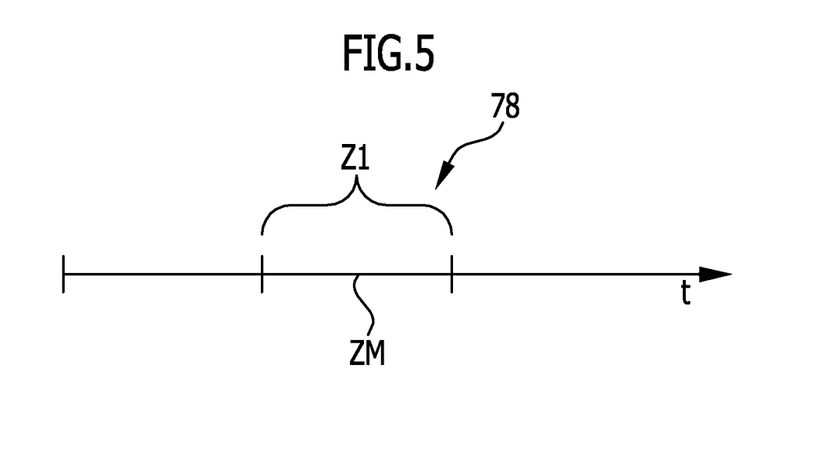
FIG. 5 shows a schematic depiction of a time profile of an embodiment of an interruption of the current at the magnetic field generating device.

At the interruption 78, the duration in time of the pause time Z1 corresponds to that of the measuring time Zm (FIG. 5).

Figure 6:
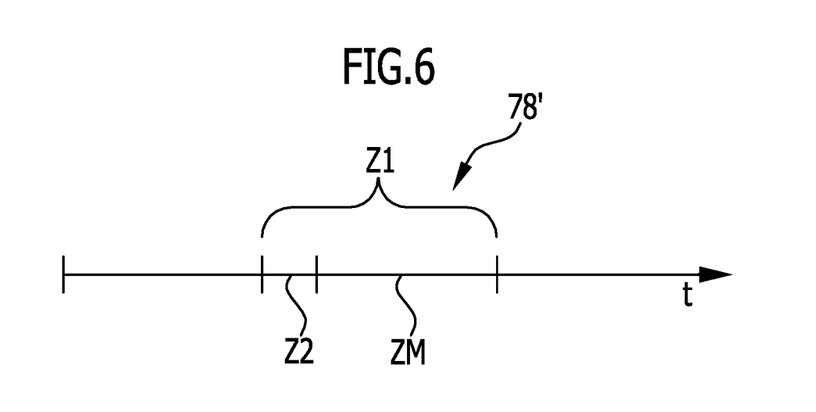
FIG. 6 shows a schematic depiction of a time profile of a further embodiment of an interruption of the current at the magnetic field generating device.

In a further embodiment of an interruption 78', provision is made for the measurement to occur temporally offset by a first wait time Z2 after the beginning of the pause time Z1 (FIG. 6). The measuring time Zm then begins only after expiration of the wait time Z2 after the beginning of the pause time Z1. The pause time Z1 corresponds to a sum of the first wait time Z2 and the measuring time Zm.

Potential interference currents which are still present at the time of the deactivation of the application of current are able to dissipate during the first wait time Z2. The accuracy of the measurement is further improved in this way.

In a further embodiment of an interruption 78" (FIG. 7), the measurement also occurs after the beginning of the pause time Z1 after expiration of the first wait time Z2. However, the measuring time Zm ends temporally offset by a second wait time Z3 before the end of the pause time Z1. The pause time Z1 corresponds to a sum of the first wait time Z2, the measuring time Zm, and the second wait time Z3.

Figure 7:
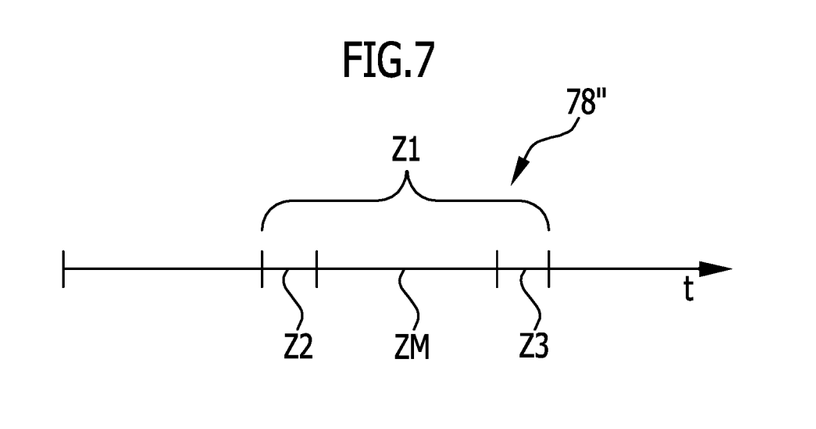
FIG. 7 shows a schematic depiction of a time profile of a further embodiment of an interruption of the current at the magnetic field generating device.

In this way, the measurement may be completed temporally offset by the second wait time Z3 before the end of the pause time Z1. Interference during a transmission of measurement values to the control device 34 are thereby prevented or at least avoided.

REFERENCE NUMERAL LIST i effective value
T temperature
P pressure
Z1 pause time
Z2 first wait time
Z3 second wait time
Zm measuring time
I first region
II second region
III third region
IV fourth region
V fifth region
I' first region
II' second region
10 repair apparatus
10' repair apparatus 12 workpiece
14 repair region
16 repair material
17 layer
18 induction heating apparatus
20 magnetic field generating device
22 heat source
24 electromagnetic field
26 heat
28 induction generator
30a line
30b line
32 line
34 control device
35 storage device
35' temperature profile specification
36 temperature sensor
38 line
40 underpressure region
42 vacuum hood
44 underpressure application device
46 line
48 line
50 line
52 pressure sensor
54 coil device
56 support
58 structural material
60 high-frequency litz wire
62a connector
62b connector
64 channel device
66 supply channel
68 upper side
70 lower side
72 manifold
74 connector
76 side
77a heating region
77b working region
77c cooling region
78 interruption
78' interruption
78" interruption
80 thermal insulating layer
82 side
84 first side
86 second side
88 side

What is claimed is:

1. Repair method for a workpiece of a plastics material:
wherein an induction heating apparatus is positioned at a repair region of the workpiece;
the induction heating apparatus comprises a magnetic field generating device and a heat source;
the heating source is arranged between the magnetic field generating device and the repair region;
a repair material is positioned on the repair region, the repair material is heated by way of the heat source arranged at the repair region; and
the heat source is inductively heated by the magnetic field generating device,
wherein a temperature is measured by which an application of heat to the repair material by the heat source is characterized,
wherein the temperature is controlled by means of a control device,
wherein the control of the temperature by the control device occurs according to a temperature profile specification,
wherein the temperature profile specification has a heating region and a working region following to the heating region,
wherein the magnetic field generating device is applied with an electric current,
wherein at least one of the electric current, an electric voltage, and electric power resulting from the application of current is a controlled variable,
wherein the application of current to the magnetic field generating device is deactivated for control pause times, and
wherein the regulation of the temperature occurs according to the temperature profile specification by way of the deactivation of the application of current with the control pause times.

2. Repair method in accordance with claim 1, wherein at least one of the electric current, the electric voltage, and the electric power is controlled by the control device in such a way that a time profile of at least one of an effective value of the electric current, an effective value of the electric voltage, and an effective value of the electric power at least approximately corresponds to a time profile of the temperature.

3. Repair method in accordance with claim 1, wherein the temperature profile specification is at least approximately constant within the working region.

4. Repair method in accordance with claim 1, wherein, in the case of a thermoplastic repair material, the temperature profile specification within the heating region is monotonically increasing.

5. Repair method in accordance with claim 1, wherein, in the case of a thermosetting repair material, the temperature profile specification within the heating region is monotonically increasing in sections.

6. Repair method in accordance with claim 1, wherein, in the case of a thermosetting repair material, the temperature profile specification has within the heating region a plateau region in which the temperature profile specification is at least approximately constant.

7. Repair method in accordance with claim 1, wherein, in the case of a thermosetting repair material, the temperature profile specification within the heating region has an increase starting from an initial temperature, wherein the increase is followed by a plateau region in which the temperature profile specification is at least approximately constant, and wherein the plateau region is followed by a further increase.

8. Repair method in accordance with claim 1, wherein the temperature profile specification has a cooling region following the working region, and in particular wherein the temperature profile specification within the cooling region is monotonically falling.

9. Repair method in accordance with claim 1, wherein an underpressure region is produced between a vacuum hood of the induction heating apparatus and the workpiece.

10. Repair method in accordance with claim 9, wherein the control of the pressure by the control device occurs according to a specified working pressure or a specified working pressure range.

11. Repair method in accordance with claim 9, wherein a constant spacing is produced between the magnetic field generating device and the heat source.

12. Repair method in accordance with claim 1, wherein an application of current to the magnetic field generating device is deactivated for a pause time, and wherein within this pause time at least one of the temperature is measured and a pressure is measured, and wherein at least one of the temperature measured and the pressure measured is transmitted to the control device within the pause time.

13. Repair method in accordance with claim 12 wherein the application of current is deactivated in a clock-timed manner with a clock frequency, and wherein at least one of the temperature and the pressure is measured in a clock-timed manner with said clock frequency.

14. Repair method in accordance with claim 12, wherein at least one of the temperature and the pressure is measured temporally offset by a first wait time after the beginning of the pause time.

15. Repair method in accordance with claim 12, wherein a measurement of at least one of the temperature and the pressure is completed temporally offset by a second wait time before the end of the pause time.

16. Repair method in accordance with claim 1, wherein the repair material is arranged in solid form on the repair region.

17. Repair method in accordance with claim 1, wherein a thermal insulating layer is arranged between the magnetic field generating device and the heat source.

18. Repair apparatus on a workpiece of a plastics material, comprising:
   an induction heating apparatus which is arranged at the workpiece;
   a repair material which is arranged on a repair region of the workpiece;
   wherein the induction heating apparatus comprises a magnetic field generating device and a heat source;
   wherein the heat source is arranged between the magnetic field generating device and the repair region; and
   at least one temperature sensor;
   wherein the at least one temperature sensor measures a temperature by which an application of heat to the repair material by the heat source is characterized,
   wherein the at least one temperature sensor is signal-operatively connected to a control device,
   wherein the control device has a storage device in which a temperature profile specification is stored,
   wherein the control device controls the temperature, measured by the at least one temperature sensor, according to the stored temperature profile specification,
   wherein the magnetic field generating device is applied with an electric current,
   wherein at least one of the electric current, an electric voltage, and electric power resulting from the application of current is a controlled variable,
   wherein the application of current to the magnetic field generating device is deactivated for control pause times, and
   wherein the regulation of the temperature occurs according to the temperature profile specification by way of the deactivation of the application of current with the control pause times.

19. Repair apparatus in accordance with claim 18, wherein the induction heating apparatus comprises a vacuum hood.

20. Repair apparatus in accordance with claim 18, wherein a thermal insulating layer is arranged between the magnetic field generating device and the heat source.

* * * * *